(12) United States Patent
West et al.

(10) Patent No.: US 10,889,412 B2
(45) Date of Patent: Jan. 12, 2021

(54) PAPER CLOSURES FOR PAPER CONTAINERS

(71) Applicants: Ellery West, Crescent City, CA (US); Gail West, Crescent City, CA (US)

(72) Inventors: Ellery West, Crescent City, CA (US); Gail West, Crescent City, CA (US)

(*) Notice: Subject to any disclaimer, the term of this patent is extended or adjusted under 35 U.S.C. 154(b) by 0 days.

(21) Appl. No.: 14/760,956

(22) PCT Filed: Jan. 14, 2014

(86) PCT No.: PCT/US2014/011527
§ 371 (c)(1),
(2) Date: Jul. 14, 2015

(87) PCT Pub. No.: WO2014/110592
PCT Pub. Date: Jul. 17, 2014

(65) Prior Publication Data
US 2016/0016699 A1   Jan. 21, 2016

Related U.S. Application Data

(60) Provisional application No. 61/752,317, filed on Jan. 14, 2013.

(51) Int. Cl.
*B65D 43/02* (2006.01)
*B65D 65/46* (2006.01)

(52) U.S. Cl.
CPC ....... *B65D 43/0212* (2013.01); *B65D 43/021* (2013.01); *B65D 65/466* (2013.01);
(Continued)

(58) Field of Classification Search
CPC .......... B65D 43/0208; B65D 43/0212; B65D 43/021; B65D 43/0218; B65D 43/022; B65D 43/0222; B65D 15/20; B65D 65/466; B65D 2543/00564; B65D 2543/00268; B65D 2543/00518; B65D 2543/00537;
(Continued)

(56) References Cited

U.S. PATENT DOCUMENTS 1,834,085 A * 12/1931 Bloom ................. A47G 19/186
206/229
1,836,220 A * 12/1931 Bloom ................. B65D 43/022
215/231
(Continued)

FOREIGN PATENT DOCUMENTS

| DE | 4337176 A1 | 5/1995 |
| FR | 1025107 A | 4/1953 |
| NL | 57813 C | 1/1946 |

*Primary Examiner* — Andrew T Kirsch
(74) *Attorney, Agent, or Firm* — Fish IP Law, LLP

(57) ABSTRACT

A container has a fibrous lid (100) and vessel (110) that have mutually mating raised beads (104, 112). The beads are preferably formed in rings, which in the case of the lid is positioned on the underside of the cap, and in the case of the vessel is positioned at the mouth of the vessel. Also in preferred embodiments, the beads can have outward curls, inward curls, or have a split formation. Both lid and vessel are preferably made of at least 85 wt % paper. The non-paper percentages can advantageously comprise one or more of glues, adhesives, films, and/or moisture barriers, and in most preferred embodiments, the moisture barrier is also an adhesive.

8 Claims, 3 Drawing Sheets

(52) U.S. Cl.
CPC ............... *B65D 2543/0062* (2013.01); *B65D 2543/00092* (2013.01); *B65D 2543/00268* (2013.01); *B65D 2543/00518* (2013.01); *B65D 2543/00537* (2013.01); *B65D 2543/00638* (2013.01); *B65D 2543/00685* (2013.01); *B65D 2543/00731* (2013.01); *B65D 2543/00796* (2013.01); *B65D 2543/00842* (2013.01)

(58) Field of Classification Search
CPC .... B65D 2543/00555; B65D 2543/005; B65D 2543/0049
See application file for complete search history.

(56) References Cited

U.S. PATENT DOCUMENTS

| | | | |
|---|---|---|---|
| 1,925,471 A | 9/1933 | Taylor | |
| 3,397,814 A * | 8/1968 | Zackheim | B29C 45/14336 220/792 |
| 4,155,481 A * | 5/1979 | Takahashi | B65D 17/508 220/270 |
| 4,441,626 A | 4/1984 | Hall | |
| 5,246,134 A * | 9/1993 | Roth | B65D 43/0212 215/232 |
| 5,384,173 A * | 1/1995 | Akao | G03C 3/00 220/669 |
| 5,398,908 A * | 3/1995 | Kienle | A47J 43/20 206/471 |
| 5,763,100 A * | 6/1998 | Quick | B65D 65/42 428/486 |
| 6,019,240 A * | 2/2000 | Legeza | B65D 45/345 220/319 |
| 6,196,451 B1 * | 3/2001 | Helms | B29C 45/14336 220/782 |
| 6,295,658 B1 * | 10/2001 | Jenkins | A47G 27/0225 4/251.1 |
| 6,427,862 B1 * | 8/2002 | Hsu | B65D 17/502 220/254.1 |
| 7,819,251 B2 * | 10/2010 | West | B65D 35/14 206/484.2 |
| 2008/0128382 A1 * | 6/2008 | Yamamoto | B65D 47/0814 215/236 |
| 2012/0145732 A1 * | 6/2012 | Padek | B65D 81/3876 220/738 |
| 2014/0208691 A1 * | 7/2014 | Ballering | B65D 77/048 53/432 |

* cited by examiner

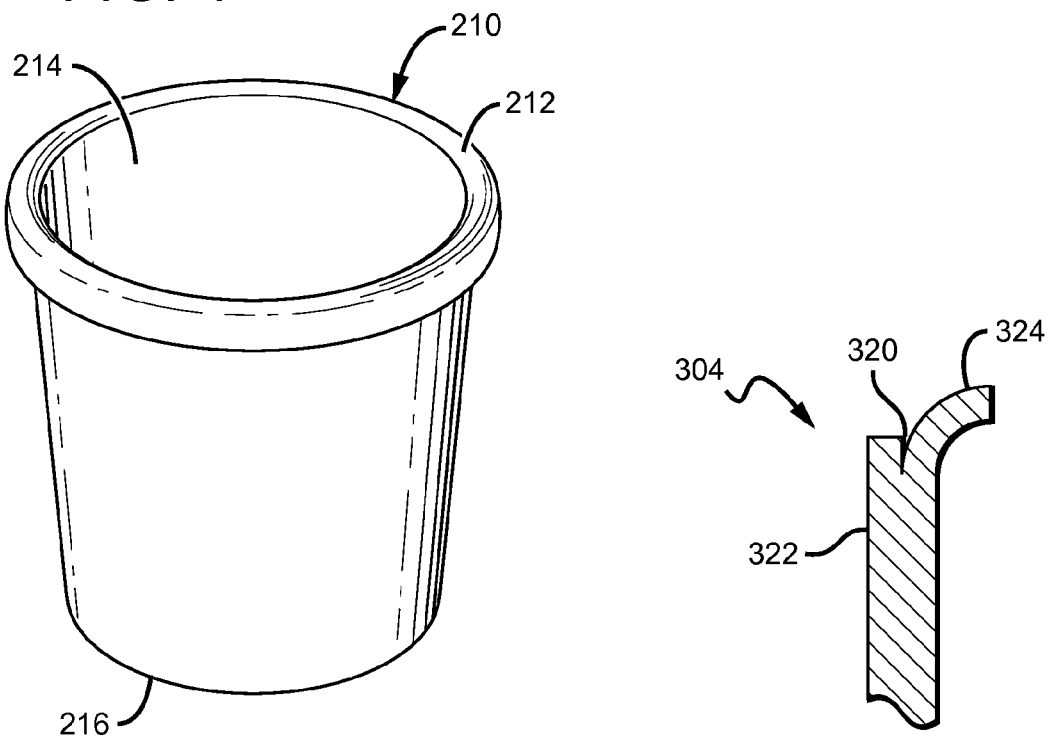
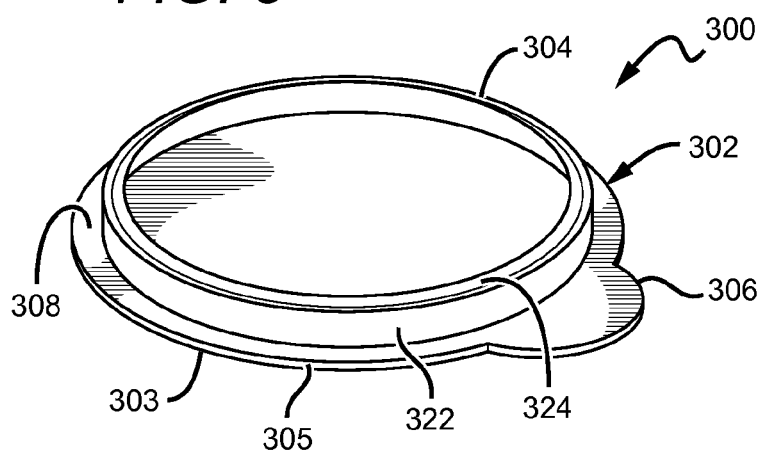

PAPER CLOSURES FOR PAPER CONTAINERS

This application claims the benefit of priority to U.S. Provisional Application No. 61/752,317 filed Jan. 14, 2013. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is paper containers.

BACKGROUND

The following description includes information that may be useful in understanding the present invention. It is not an admission that any of the information provided herein is prior art or relevant to the presently claimed invention, or that any publication specifically or implicitly referenced is prior art.

Paper and fiber based packaging offers many advantages over plastic, glass and metal containers. Plant based materials such as paper and molded fiber are compostable, are a part of the life cycle, are easily recyclable, and are thus perhaps the most sustainable packaging option existing today. However, plant based materials have one important disadvantage; they do not form durable threads to support conventional closures such as the common screw cap. This disadvantage has encouraged the use of metal and plastic closures in combination with fibrous containers, yielding less environmentally sustainable packaging. To be properly recycled, the plastic or metal parts must be separated from the paper portion of the container. Since this requires attention and effort, the separation task is seldom performed, and instead, the entire package is combined with other household waste and enters the garbage stream where it is incinerated or sequestered in landfills. Since the most environmentally sustainable packaging is a homogenously fiber based container, many practitioners in the art have devised various approaches to solving this problem.

The formation of flat paper into a cap (or more generically a lid) shape that slidably engages over the open end of a tubular container is well known and often used. However this type of closure is loose fitting, and offers little oxygen, moisture, or product spill resistance. Another approach is to wedge a disk into the open end of the tubular container, such as that described in WIPO publ. no. WO2011/082486 to Amhil Enterprises (publ. 14 Jul. 2011). This type of closure has been used with single serving pre-packaged ice cream, and often has an integral pull tab, which enables its removal. This approach offers better oxygen, moisture and product spill resistance, however, the closure is relatively non-durable and can become difficult to manipulate as it wears.

More durable closures have been developed that address fibrous container closure needs. For example, the West Easy Twist™ closure is formed of molded fibrous materials and engageably twists and pushes into a fibrous opening. Such enclosures are intended for, and function best with, formed and molded apertures that are best characterized as bottle openings. Another closure, the West Pinch Top™ closure is designed to function with fibrous tubular containers.

This device has a semi-flexible slideable member that engages with the interior side of a tubular container, offering a secure closure. Such closures are relatively expensive to produce, and while compostable, they pose recycling difficulties because they are not entirely constructed of fibrous materials. The West Biodegradable Container™ having a Compressible Lid™ goes further, contemplating a container and lid system having a fibrous container with an inwardly disposed edge curl, which is intended to engage with a corresponding closure. The closure may be formed of molded fiber, paper, plant resins, or flexible compostable materials such as latex, polymerized vegetable oils. While presenting a substantial improvement to tubular packaging closure technology, many embodiments of this technology are expensive to produce, hindering their widespread use. Further, since various embodiments are not fiber based, they will not readily be recycled with other paper, impacting overall packaging sustainability.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for fiber-based closures that offer easy manipulation by users, reusability and protection from oxygen and moisture ingress, as well as keeping contents secure inside of the container.

SUMMARY OF THE INVENTION

The inventive subject matter provides apparatus, systems and methods in which a lid for use in closing a container comprises a fibrous material, and includes a raised bead or other projection extending from the lid's bottom surface that preferably mates with a bead of the container.

In other contemplated embodiments, a fibrous lid and vessel can include mutually mating raised beads. In such embodiments, it is preferred that the bead of the fibrous lid extends from a bottom surface of lid.

The beads are preferably formed in rings, with the bead of the lid being disposed on the underside of the cap, and the bead of the vessel being disposed at the vessel's mouth. In preferred embodiments, the beads can have outward curls, inward curls, or a split formation.

Both lid and vessel are preferably made of at least 85 wt % paper, more preferably 90 wt % paper, and most preferably 95 wt % paper. The non-paper percentages can advantageously comprise one or more of glues, adhesives, films and/or moisture barriers, and in most preferred embodiments, the moisture barrier is also a glue. It is preferred that substantially the entirety of the lid and vessel, including glues, adhesives, films and/or moisture barriers, will be biodegradable.

As used herein "fibrous material" means materials characterized by a plurality of discrete fibers. The filaments can be plant or animal derived, synthetic, or some combination of these. In "plant-derived fibrous materials" the filaments are at least predominantly of plant origin, examples of which include wood, papyrus, rice, ficus, mulberry, fibers, cotton, yucca, sisal, bowstring hemp and New Zealand flax. Further, as used herein the term "fibrous wall" means a wall comprising a fibrous material as a significant structural constituent. The fibrous walls contemplated herein preferably have at least 2, 5, 10, 20 or even 30 dry weight percent of fibers. Preferably, the fibrous walls have at least 80 or 90 dry weight percent of fibers. Paper is generally a fibrous material that is usually made by pressing and de-watering moist fibers, typically cellulose pulp derived from wood rags, or grasses. Preferably, the fibrous material is rigid and is largely inflexible, as, for example, layered paper or corrugated cardboard. The structure of a fibrous material that is substantially rigid will tend to bend or break if a great deal of pressure is placed upon it, in contrast to a flexible material that will tend to flex and return back to its original shape after the pressure is released. Preferably, each of the portions of the package comprising the fibrous material are all rigid, for example the walls of the tube and the ends of the tube.

As used herein, an "adhesive" is any compound in a liquid or semi-liquid state used to adhere or bond items together. Before such an adhesive hardens, such adhesives could be pastes (very thick) or glues (relatively fluid). All commercially suitable adhesives are contemplated, including for example library paste or simply glue made from water, milk powder, vinegar, and baking soda (e.g., a biodegradable adhesive). Other suitable permeation barrier materials include those disclosed in U.S. Pat. No. 7,344,784 to Hodson or U.S. Pat. Appl. no. 2005/0130261 to Wils (publ. June 2005). Such adhesives are preferably made from a substance that provides a permeation barrier that is substantially impermeable to air, oil, and water.

As used herein, a statement that a permeation barrier is "substantially impermeable" to air, oil and/or water means that a wall treated with that additive has a transfer rate of less than or equal to 50 µl of air, water and/or sunflower oil per $cm^2$ per six-month period of time at room temperature and normal atmospheric pressure (STP). Preferably, the permeation barrier material is substantially impermeable to each of air, water and oil. It is contemplated that the permeation barrier material could be applied to parts of the package prior to assembly, or even after assembly. In preferred embodiments, the outer wall comprises a rolled paper material upon which the permeation barrier material has been coated. It is also contemplated that the permeation barrier material could be: (1) on an exterior surface or interior surface of the outer wall; (2) impregnated within the material forming the outer wall; or (3) disposed between the layers of the outer wall.

It is contemplated that permeation barriers could be applied to parts of the vessel prior to assembly, or even after assembly. In some contemplated embodiments, the walls comprise a rolled paper upon which an adhesive has been coated and/or impregnated between each layer of the rolled paper. Thus, for example, the walls could include one, two, four, six, eight, or more layers (wraps) of the paper/permeation barrier combination.

As used herein, a "biodegradable material" means a material that will break down to at least 90% $H_2O$, $CO_2$, and biomass within a period of six months from the action of naturally occurring micro-organisms such as bacteria, fungi, algae etc. under favorable conditions. For example, milk, baking soda, meat, plants, wood, cotton, polylactic acid polymers, and paper are all deemed herein to be biodegradable. In preferred embodiments, every element of the jar, which could include an inner wall, a cap, a cover, spacers, the bottoms, adhesives, and permeation barrier materials, are biodegradable.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 4 is a perspective view of one embodiment of a vessel having an outward curled edge that mates with the inward curled edge of FIG. 3.

FIG. 5 is a perspective view of one embodiment of an underside of a lid having a split edge coupling.

FIG. 6 is an upside down, vertical cross-section view of the split edge coupling of FIG. 5.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
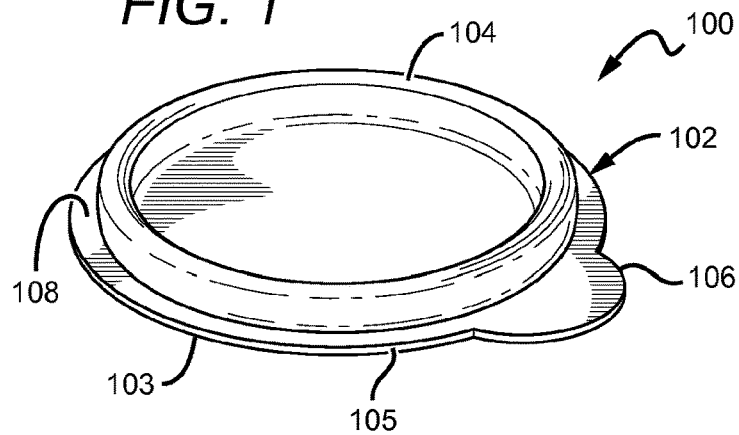
FIG. 1 is a perspective view of one embodiment of an underside of a lid having an outward curled edge.
Figure 2:
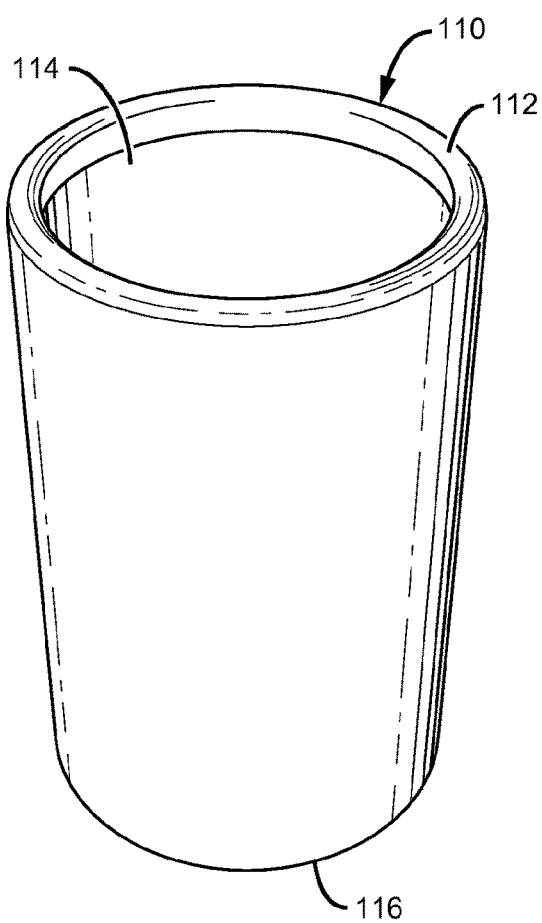
FIG. 2 is a perspective view of one embodiment of a vessel having an inward curled edge that mates with the outward curled edge of FIG. 1.

In FIGS. 1-2, one embodiment of a closure 100 for a vessel 110 is shown that includes a lid 102 preferably composed of one or more fibrous materials. It is preferred that the lid 102 comprise at least 90 wt % paper, and more preferably, at least 95 wt % paper. Lid 102 can include a top surface 103, one or more side surfaces 105, and a bottom surface 108. Lid 102 preferably includes a raised bead 104 that extends from the bottom surface 108 or side surface of the lid 102. Preferably, the bottom surface 108 is flat and includes a rounded edge 105 interrupted by a pull tab 106. However, the specific shape of the bottom surface 108 will likely depend on the corresponding shape of the vessel's opening.

As shown in FIG. 1, the raised bead 104 can include an outward curl, which preferably mates with a curled edge 112 of a vessel 110, such as that shown in FIG. 2. For cylindrical vessels, the raised bead 104 preferably comprises a ring-shape. Of course, the specific shape of the raised bead can be varied to allow the bead to mate with a desired container. It is preferred that the raised bead 104 has a minimal depth long enough to engage the vessel curled edge 112, but no further than being affixed to a disk that is as large or larger than the vessel's opening 114.

The raised bead 104 can advantageously be unitary with a bottom surface 108 of the lid 102, and similarly, if the vessel 110 also or alternatively comprises a raised bead, the raised bead could be unitary (i.e., integral) with the vessel 110. In such embodiments, it is preferred that the raised bead 104 comprises a fibrous material, and more preferably comprises the fibrous material forming lid 102. It is also contemplated that the raised bead 104 can be added to the underlying surface of the lid or vessel, such as in the case of a glue bead added to a surface. Preferably, the lid 102 and raised bead 104 are biodegradable.

It is still further contemplated that a glue, adhesive, and/or moisture barrier can be coated onto and/or incorporated within the lid 102 or vessel 110 as well as raised bead 104. Indeed, the lids and vessels shown in FIGS. 1-4, 5, and 7-8 should be viewed as being coated with a glue-based moisture barrier, and where the vessel 110 comprises is layered with rolls of paper, each layer can be coated with the moisture barrier. For a further discussion, please see U.S. Pat. No. 7,819,251 to West and West, and U.S. patent application having Ser. No. 12/505,211 also to West and West, both of which are incorporated herein by reference.

Rather than being formed of a fibrous material, it is alternatively contemplated that the lid 102 could comprises a flat, planar disk having a protrusion 106 (pull tab). An adhesive can be applied to a bottom surface 108 of the lid 102 to form the raised bead 104, which is preferably sized and dimensioned to positively engage with a curled edge 112 of the vessel 110.

Once the adhesive is cured, the raised bead 104 becomes inherently non-adhesive on its external surfaces, yet retains a strong bond to the lid 102. In addition, the raised bead 104 formed of adhesive may be coated with a material that renders the bead 104 non-adhesive on its external surfaces. Further, this adhesive may be a 'hot-melt' adhesive. Further, the adhesive may be applied using a mold placed about the disk 102 prior to application of the adhesive, and then removed after curing to create the desired shape and contours of the bead 104.

To help ensure the lid 102 is not removed from vessel 110 unintentionally, lid 102 could be affixed to the vessel 110 with glue or other adhesive, for example. In addition, the vessel 110 could include inwardly or outwardly tabs that facilitate connection to lid 102.

Vessel 110 is also preferably composed of a fibrous material, and most preferably composed of multiple plies of paper forming a closed end 116 and an open end 114. In such embodiments, vessel comprises at least 90 wt % paper, and more preferably, at least 95 wt % paper.

Open end 114 can include a curled edge 112 disposed toward a center of the vessel 110, which is configured to mate with the raised bead 104 of lid 102 to thereby close the vessel 110. Thus, the raised bead is sized and dimensioned to positively contact the curled edge 112 of the vessel 110 to close, and preferably seal, vessel 110.

It is also contemplated that the curled edge 112 of vessel 110 can be formed by applying adhesive to an edge of the vessel 110, which could result in a protrusion on the interior, exterior or both, near the opening 114. The adhesive may have properties and be formed by the methods described above in forming the raised bead 104 of the lid 102 from adhesive.

To facilitate removal of the lid 102 from vessel 110, lid 102 can further include a pull tab 106 or other protrusion. At least apportion of the lid 102 can be coated or impregnated with a moisture barrier to prevent moisture from seeping through the lid 102.

It is further contemplated that the fibrous vessel could have internal supports, such as that described in WIPO publ. no. 2010/37583 to West and West.

Figure 3:
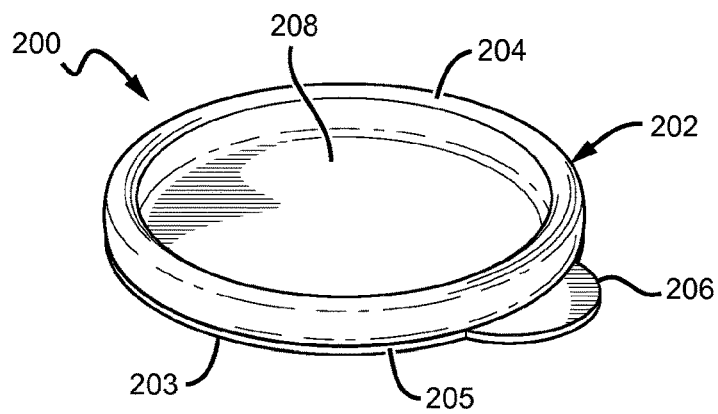
FIG. 3 is a perspective view of one embodiment of an underside of a lid having an inward curled edge.

FIGS. 3-4 illustrates another embodiment of a closure 200 for a vessel 210 that is similar to FIGS. 1-2. As shown in FIG. 4, vessel 210 has an outwardly disposed curled edge 212. In such embodiments, lid 202 preferably has an inwardly disposed curl 204 that engages with the curled edge 212 of vessel 210. As shown in FIG. 3, at least a portion of the raised bead 204 is medial to an edge 205 of the bottom surface 208 of the lid 202. However, in alternative embodiments, it is contemplated that at least a portion of the raised bead can extend radially beyond an edge of the lid's bottom surface.

It is contemplated that the closure 200 could be formed from a single piece of paper, although multiple pieces of paper or other fibrous material could be used. To remove the closure 200 from vessel 210, a user can apply upward force to the curled edge 204 of the lid 202.

In still other contemplated embodiments, two or more piece closures could have protrusions facilitating removal of the lid 202 from vessel 210. Additionally or alternatively, lid 202 may have openings to enable the contents of vessel 210 to be removed from the vessel in a controlled manner, such as is advantageous when consuming hot beverages for example. With respect to the remaining numerals in each of FIGS. 3-4, the same considerations for like components with like numerals of FIGS. 1-2 apply.

In FIGS. 5-6, another embodiment of a closure 300 for a vessel is shown having a plurality of adjoining plies of a relatively thick fibrous composition such that the closure 300 is dimensioned to cover a vessel's opening. Preferably, the closure 300 comprises a lid 302 having a raised ring 304. A ringed cut 320 can be made medial to an edge 322 of the raised ring 304 sufficiently deep to separate a circumferential portion 324. The portion 324 can then be forced away from the remainder of ring 304 to create a curved edge that is configured to positively engage with a curled edge or other projection of a vessel. The split portion of ring 304 may be buttressed by placing glue or other adhesive within the split to support the restricted opening formation shape.

In other embodiments, a vessel can include a wall that defines a vessel's opening, where an upper portion of the wall is split in a similar manner to the closure of FIG. 5. A portion of the wall can be forced inwardly to create a smaller circumference opening. It is contemplated that the split may be buttressed by disposing glue or other adhesive within the split to support the restricted opening formation shape. Further, it may be advantageous to remove some portion of the remaining cylinder opening such that it advantageously allows a closer disposition of a lid to the vessel.

Alternatively, where the vessel or closure includes a split portion, the split portion could be forced outwardly from the opening. The remaining interior portion of the split may be trimmed or removed, however it is not required. In such embodiments, it is contemplated that the closure or vessel could include interiorly disposed projections or an edge that positively engages with the vessel/closure.

Figure 7:
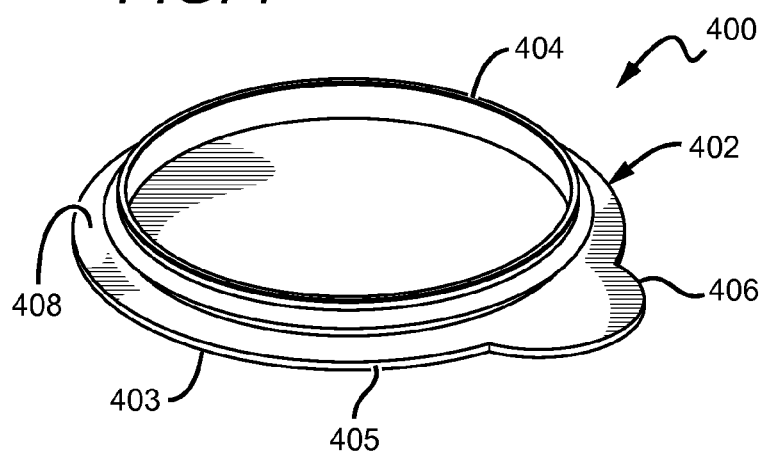
FIG. 7 is a perspective view of one embodiment of an underside of an overcap having an exterior bead.
Figure 8:
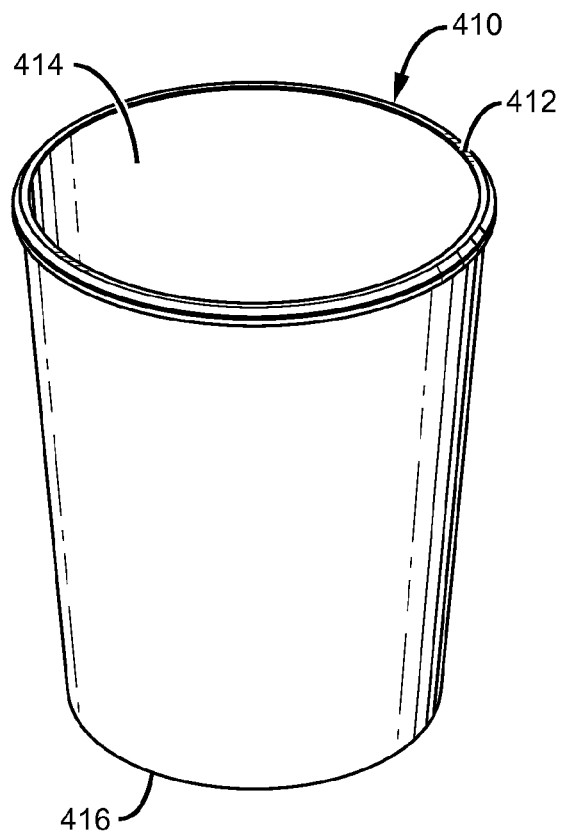
FIG. 8 is a perspective view of one embodiment of a vessel having an interior bead that mates with the exterior bead of FIG. 7.
Figure 9:
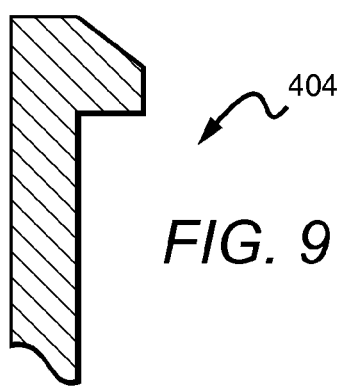
FIG. 9 is a vertical cross-section view of the exterior bead coupling of FIG. 8, viewed from an underside of the cap.

FIGS. 7-9 illustrates a closure 400 formed from a piece of paper and having a raised portion 404 that is sized and dimensioned to engage with an inwardly or outwardly disposed edge curl or protrusion 412 of a vessel 410. In preferred embodiments, the piece of paper is mated to a disk 402 that may have a protrusion 406 (thumb tab). The formed paper may be thick and rigid enough to engage repeatedly with the opening 414 of the vessel 410 without premature deformation causing closure failure. Alternatively, the paper may have a substance placed within or about the raised portion 404 that will advantageously support its shape, and more advantageously, the material may be an adhesive that also attaches the raised paper portion 404 to the disk 402.

FIG. 9 is a vertical cross-section of the exterior bead coupling shown in FIG. 8, viewed from an underside of the lid 402.

In still further embodiments, a rigid piece of paper, fibrous or other biodegradable material could be shaped to form a lid that is the same size or larger than an opening of a vessel. A rigid or flexible ring, band, or protrusion can be attached to a disk, and can be shaped to positively engage with a vessel. The lid may engage to a vessel that has inward, outward, or both, curls or protrusions.

In yet another embodiment, a vessel can have a cut edge with a rigid or flexible ring, band, or other protrusion attached near the cut edge. It is contemplated that the protrusion may be disposed on the interior, exterior or both of the vessel's opening, and is shaped and dimensioned to positively engage with a cap.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A closure for use in sealing an opening of a vessel having a curled upper rim, comprising:
   a substantially flat lid comprising a fibrous material having a top surface, a bottom surface, and a curved perimeter surface; and
   a ring-shaped, rigid bead, comprising a water-based, biodegradable adhesive material, that is cured to be non-adhesive, the bead positioned inwardly from the perimeter, and extending downwardly from the lid;
   wherein the lid and the bead are further configured such that when the closure is sealingly mated with the vessel, the bottom surface of the lid is configured to mate with a top edge of the curled upper rim, and the bead is configured to mate with an inner surface of the curled upper rim.

2. The closure of claim 1, wherein the rigid bead comprises a split edge coupling.

3. The closure of claim 1, wherein the rigid bead is unitary with a bottom surface of the lid.

4. The closure of claim 1, further comprising a pull tab extending from the lid.

5. The closure of claim 1, wherein the lid includes a coated moisture barrier.

6. The closure of claim 1, wherein the adhesive surface comprises a glue.

7. The closure of claim 1, wherein the lid comprises at least 95 wt % paper.

8. The closure of claim 1, wherein the bottom surface of the lid includes a flat landing area between the ring-shaped, rigid bead and the curved perimeter surface, the landing area sized and dimensioned to rest upon the curled upper rim of the vessel when the lid is sealed to the vessel.

\* \* \* \* \*